April 16, 1968  J. T. BUCKETT  3,377,915
ASSEMBLY APPARATUS
Filed Sept. 19, 1966  2 Sheets-Sheet 1
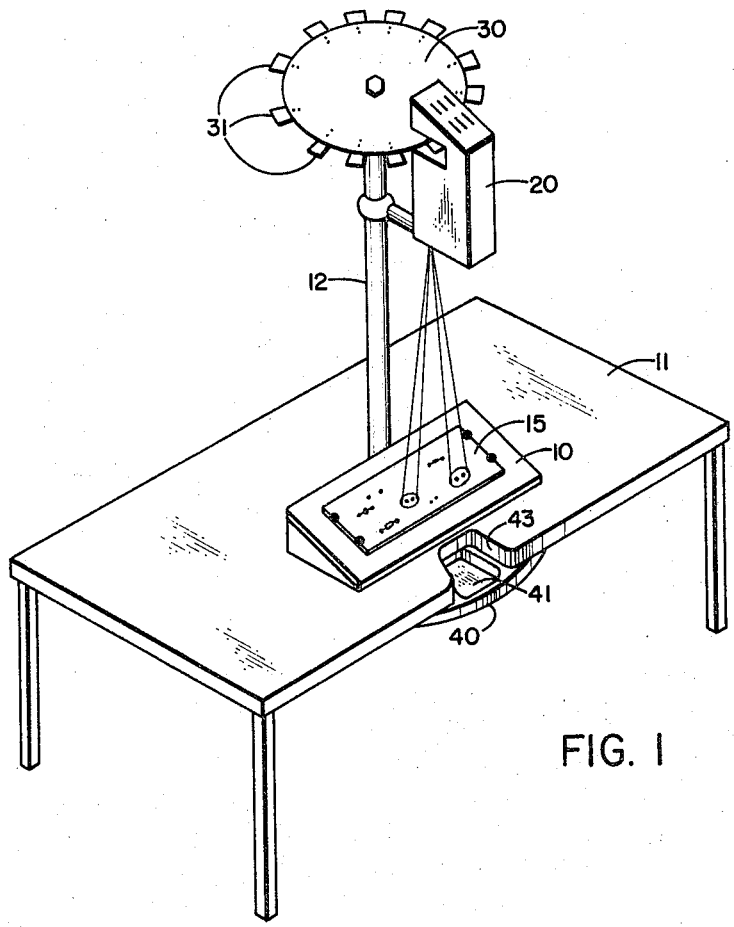
FIG. 1
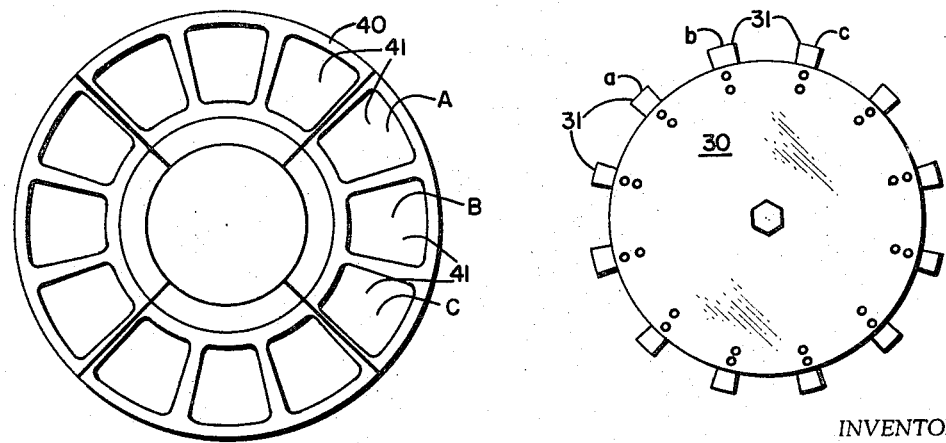
FIG. 2
FIG. 3
INVENTOR.
JAMES T. BUCKETT
BY Roger W. Jensen
ATTORNEY

INVENTOR.
JAMES T. BUCKETT 3,377,915
ASSEMBLY APPARATUS
James T. Buckett, Shorewood, Minn., assignor to Honeywell Inc., Minneapolis, Minn., a corporation of Delaware
Filed Sept. 19, 1966, Ser. No. 580,238
4 Claims. (Cl. 88—24)

ABSTRACT OF THE DISCLOSURE

Apparatus for assembling the component parts of a composite body. An optical projector is mounted for projecting images onto a working surface, and a series of slides are provided to be inserted into the projector sequentially in a predetermined order, each slide containing directions for one step in the assembly sequence, including the part type and its location.

---

The present invention provides an apparatus for assembling the component parts of a composite body. More particularly, the invention will find application in the assembly of electrical components on circuit boards on which appropriate spaces and connecting junctions are provided for receiving electrical elements.

In the prior art, the electric circuit boards are generally assembled by a trained operator who selects and arranges the various electrical elements in accordance with shop drawings, illuminated charts, or other visual references. The accuracy with which the circuits are assembled depends almost exclusively on the ability of the operator to concentrate on correct selection of elements and on proper transfer of information by the operator from the visual reference to the assembly surface. It is the purpose of the present invention to relieve the operator of some of these functions and to thereby improve the accuracy with which the circuits are assembled and thus improve the reliability of the assembled product.

The apparatus of the present invention is comprised of the following parts. It has a mounting surface for receiving the circuit board for rigid mounting in a precise predetermined position. An optical projector is mounted on a support above the mounting surface and is adapted for projecting images onto the circuit board. Appropriate film slides are provided for the projector to direct a shaped light beam onto the circuit board for identification of the correct location for a particular circuit element. For the assembly of each circuit board, a series of slides are provided, each slide containing directions for one step in the assembly process. Means are provided for inserting the slides into the projector sequentially in a predetermined order. In the preferred embodiment disclosed here, the slides are arranged on the periphery of a circular disc which is mounted for rotation. At one point, the disc passes through a slit in the projector. By rotating the disc, succeeding slides are advanced into position for projection onto the circuit board.

Also provided, as an integral part of the apparatus, is a tray with a plurality of bins for retaining the parts necessary in the production of the circuits. The access to the individual bins on the tray is limited such that during normal operation of the apparatus the parts from only one bin can be extracted at any particular instant of time. In the preferred embodiment, the number of bins in the tray corresponds to the number of slides in a particular assembly cycle. For example, in the disclosed embodiment the number of bins is equal to the number of film slides mounted on the slide carrying circular disc. The driving means for the parts tray and the film disc are designed to work in cooperation so that the parts in the accessible bin correspond to the parts demanded by the particular slides projected onto the circuit board. This feature sharply reduces the probability of errors in assembly process and is the most important feature of the present invention.

The advantages of the present invention over prior art are obvious. It eliminates distracting eye movements to visual reference. It reduces the operating learning curve to virtually zero and significantly reduces chance for operator error. It is capable of controlled assembly sequence continuity after any interuption and after complete assembly allows direct verification of the finished product. Many other advantages come to mind which will not be listed here.

It is therefore an object of the present invention to provide an improved apparatus for assembling of composite products.

And more particularly, the object of the present invention is to provide an apparatus for assembling of electric circuit boards the apparatus including an optical projector for projecting a series of images onto the circuit board, and a limited access to the parts to make available only the parts needed at the particular portion of the assembly cycle.

These and other objects will become more apparent to those skilled in the art upon examination of the following specification, claims, and drawing, in which:

FIGURE 1 is a three-dimensional representation of the essential structure of the present invention;

FIGURE 2 is a top view of a circular parts tray used in the apparatus of FIGURES 1 and 4;

FIGURE 3 is the top view of the circular slide-carrying disc; and

Figure 4:
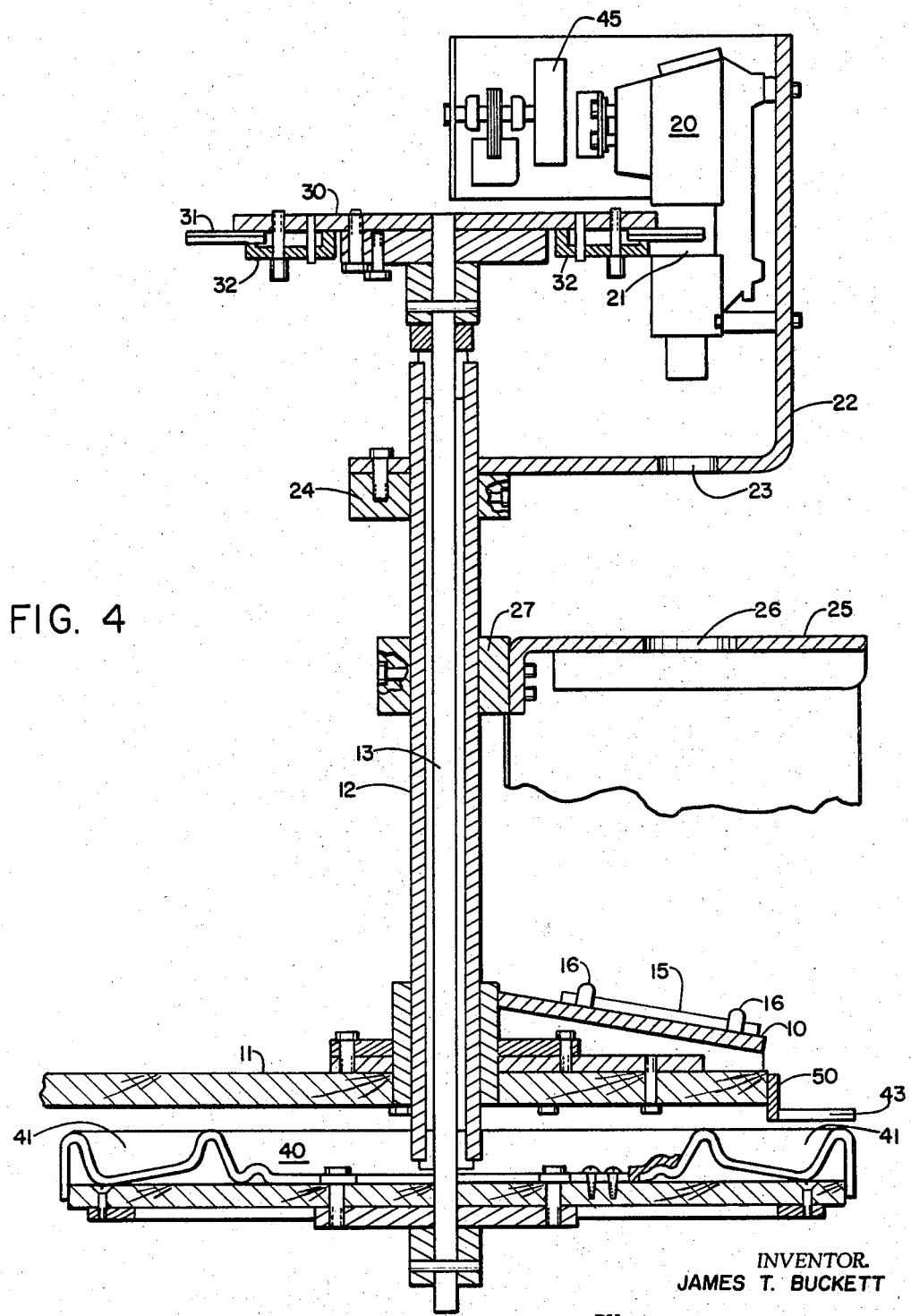
FIGURE 4 is a side view of a vertical cross section of the apparatus according to the present invention.

Referring now to FIGURE 1, a mounting surface 10 is illustrated on a supporting table 11. A vertical support 12, mounted on the table at its lower end and extending upwards, supports at its upper end an optical projector 20 and a slide-carrying disc 30. Disc 30 has a plurality of slides 31 arranged around the periphery thereof in a uniformally spaced pattern.

The disc is mounted for rotation about its center and about the axis of vertical support 12. By rotating disc 30, individual slides 31 are passed through a slit 21 in projector 20, and are placed into position for projection onto mounting surface 10. A member 15, representing a circuit board on which electrical connections are to be made, is shown mounted on mounting surface 10.

Just below the top of supporting table 11 is mounted a tray 40 with a plurality of part bins 41, as shown in FIGURE 2. The access to bins 41 is restricted so that parts from only one of the bins can be extracted at any one instant of time. The restrictive access is depicted by reference numeral 43.

The cross section of tray 40 is illustrated in FIGURE 2. It is divided into four quadrant sections. Each section may be removed individually for easy refill by crib personnel. Each quadrant is also keyed to the tray base by a dowel so that quadrants may not be erroneously mounted. Duplicate trays may be provided for line fill reduction of part requisitioning time, and reduction of wait time for parts.

Tray 40 is mounted for rotation about its geometric center. The number of bins 41 in each tray corresponds to the number of slides 31 on slide-carrying disc 30. Slide disc 30 and tray 40 are mechanically coupled so that rotation of one will cause rotation of the other. The bins which are accessible at access 43 at a particular instant of time, contain parts which are required at that same instant of time by the slide positioned within projector 20 in line for projection onto assembly surface 15. When more than one of a particular kind of element is required by the circuit, a single slide may be provided to identify the locations of all of them.

FIGURE 3 shows the top view of slide-carrying disc 30, with slides 31 arranged around the periphery thereof. As can be seen, the number of slides 31 carried by disc 30 equals the number of bins 41 in tray 40.

A somewhat more detailed description of the preferred embodiment of the invention is illustrated in FIGURE 3. Table 11 carries on it a vertical support 12 extending upward and having hollow central longitudinal passage in which is placed a shaft member 13 extending from below table surface 11 upwards to above the end of vertical support 12. At the upper end of shaft 13 is mounted slide-carrying disc 30, while at its lower end is mounted tray 40. Shaft 13 is rigidly attached to disc 30 and to tray 40 but is free to rotate within member 12. Thus, the rotation of shaft 13 will cause simultaneous rotation of both disc 30 and tray 40.

Projector 20 is mounted on a housing member 22, which in turn is attached to vertical support 12 by means of a clamp 24. Projector 20 has an opening 21 for receiving the slides which are to be projected onto a circuit board 15 resting on mounting surface 10 at the base of vertical support 12, on table 11. Projector 20 is held by housing 22 suspended at one end of slide-carrying disc 30 in such a way that by rotating disc 30, slides 31 are sequentially moved into opening 21 for projection onto circuit board 15. Projector 20 can be any one of a number of commercially available slide projectors. A fan 45 is also provided to prevent projector 20 from overheating and to prolong the life of the lamp in the projector. Fan 45 is mounted on housing member 22. Housing 22 protectively surrounds the upper end of the apparatus containing projector 20 and fan 45. An aperture 23 is provided at the lower end of housing 22 to allow the transmission of the light from projector 20 onto circuit board 15.

The work area on table 11 is shaded from the overhead lighting by a hood 25, to accentuate the contrast of the illuminated image on circuit board 15. Hood 25 is attached to the vertical support member 12 by a bracket 27. An opening 26 is provided on the upper surface of hood 25 to allow the transmission of the light from projector 20 onto circuit board 15.

Circuit board 15 or other workpiece is placed on mounting surface 10 and located on dowel pins 16 for exact registry. Mounting surface 10 may be larger than workpiece 15. This additional surface may be used for projection of instructions or information in either symbolic or printed form.

Tray 40, which is mounted for rotation beneath table 11, extends beyond the end of the table to provide access to the bins and the parts held in those bins. A fence 50 is attached to the front of the table to limit the access to only one of the bins at one particular instant of time. The access to the bins may be had through an opening 43 in fence 50. During proper operation of the apparatus, the bin exposed to opening 43 in fence 50 at any particular instant of time contains parts required by the slide which at that same instant of time is positioned in opening 21 of projector 20 and is being projected onto working surface 15.

Slides 31 are attached around the periphery of disc 30 by means of clamps 32. To prevent the distortion of the image on working surface 15 as a result of the bending of slides 31 which may occur from overheating or other causes, each slide may be mounted between a pair of glass plates. The slides will thus also be protected from damage due to scratching or other causes.

There are many variations and embodiments possible within the spirit of this invention. It is, therefore, understood that the specific embodiment of my invention shown here is for the purpose of illustration only, and that my invention is limited only by the scope of the appended claims.

I claim:

1. Apparatus for assembling the component parts of a composite body, said apparatus comprising:
    a support having a mounting surface;
    an optical projector adapted for projecting images onto said mounting surface;
    means attached to said projector for carrying a plurality of film slides, each said slide bearing the information as to the location of specific parts to be assembled on said mounting surface;
    a circular tray having a plurality of bins for storage of parts to be used in assembling of said composite body;
    a shaft member mounted on said support, said shaft member having one of its ends connected to said means for carrying slides and having its other end connected to said tray, whereby the turning of said shaft sequentially advances said slide into the projector and simultaneously moves said tray relative to said support.

2. Apparatus according to claim 1 wherein a means is provided for blocking the access to all bins on said tray except one, the motion of said tray relative to said support resulting in access to different ones of said bins during different portions of the assembly process.

3. Apparatus according to claim 1 wherein the number of bins on said tray is equal to the number of slides on said means for carrying slides.

4. Apparatus for assembling component parts of a composite body, said apparatus comprising:
    a table;
    a mounting surface located on said table, said mounting surface having means for receiving a workpiece and to hold said workpiece in a precise predetermined position;
    a vertical support member mounted on said table and extending upwards therefrom;
    a shaft mounted on said vertical support member for rotation about an axis substantially parallel to said support member, said shaft extending at its lower end through the table and at its upper end above said vertical support member;
    a circular disc mounted rigidly on said shaft at its upper end for rotation with said shaft in a plane substantially perpendicular to the axis of said shaft;
    a plurality of photographic slides arranged in a uniformally spaced pattern around the periphery of said disc, each said slide bearing the information as to the location of specific parts to be assembled on said mounting surface;
    a circular tray mounted rigidly on said shaft at its lower end for rotation with said shaft in a plane substantially perpendicular to the axis of said shaft, said tray being divided into a plurality of parts bins arranged in a circular pattern about the axis of rotation, the number of bins on said tray being equal to the number of slides on said circular disc, each said bin corresponding to a slide on said disc for carrying component parts to be assembled at locations indicated by said slide;
    a slide projector mounted at the upper end of said vertical support member adjacent the periphery of said circular disc, said projector having an opening for receiving said slides such that upon rotation of said shaft the slides are sequentially advanced into the projector optical path for projection onto said mounting surface on said table; and means for preventing during the projection of a slide onto said mounting surface the access to all bins on said tray except the bin corresponding to the projected slide.

References Cited

UNITED STATES PATENTS

| | | | |
|---|---|---|---|
| 1,840,920 | 1/1932 | Spaulding | 88—24 |
| 2,629,936 | 3/1953 | Cronstedt | 88—24 |
| 2,805,471 | 9/1957 | Lowden. | |
| 3,112,354 | 11/1963 | Urias et al. | 88—24 |

FOREIGN PATENTS 635,284   10/1959   Canada.

NORTON ANSHER, *Primary Examiner.*

J. W. PRICE, *Assistant Examiner.*